United States Patent
Xu et al.

(10) Patent No.: US 12,189,569 B1
(45) Date of Patent: Jan. 7, 2025

(54) DISTRIBUTIVE TRAINING WITH MULTICAST

(71) Applicant: Amazon Technologies, Inc., Seattle, WA (US)

(72) Inventors: Kun Xu, Austin, TX (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/449,300

(22) Filed: Sep. 29, 2021

(51) Int. Cl.
  *G06F 15/173* (2006.01)
  *G06F 13/40* (2006.01)
  *G06N 3/08* (2023.01)

(52) U.S. Cl.
  CPC .... *G06F 15/17318* (2013.01); *G06F 13/4022* (2013.01); *G06N 3/08* (2013.01); *G06F 2213/0026* (2013.01)

(58) Field of Classification Search
  CPC .................. G06F 15/17318; G06F 13/4022
  USPC .......................................................... 712/30
  See application file for complete search history.

(56) References Cited

U.S. PATENT DOCUMENTS

| | | | |
|---|---|---|---|
| 11,500,802 B1* | 11/2022 | Xu | G06F 15/17318 |
| 2016/0364343 A1* | 12/2016 | Case | G06F 12/145 |
| 2017/0041225 A1* | 2/2017 | Zheng | G06F 3/0604 |
| 2017/0070363 A1* | 3/2017 | Watkins | G06F 13/00 |
| 2019/0279082 A1* | 9/2019 | Moloney | G06V 10/82 |
| 2020/0082246 A1* | 3/2020 | Shao | G06N 3/048 |
| 2021/0064986 A1* | 3/2021 | Xi | G06F 7/483 |
| 2022/0092408 A1* | 3/2022 | Khaitan | G06N 20/00 |

* cited by examiner

*Primary Examiner* — Chun Kuan Lee
(74) *Attorney, Agent, or Firm* — Weaver Austin Villeneuve & Sampson LLP

(57) ABSTRACT

Techniques for distributing data associated with the weight values of a neural network model are described. The techniques can include performing computations associated with the neural network model in a neural network accelerator to generate data associated with weights of the neural network model. A multicast request packet is then generated to distribute the data. The multicast request packet may contain the data associated with the weights, and an address in a multicast address range of a peripheral bus multicast switch. The multicast request packet is sent to a port of the peripheral bus multicast switch, and in response, the peripheral bus multicast switch generates multiple packets containing the data from the multicast request packet and forwards them to multiple peripheral bus ports corresponding to other processing nodes of the system.

20 Claims, 10 Drawing Sheets

DISTRIBUTIVE TRAINING WITH MULTICAST

BACKGROUND

Neural networks can be used to perform tasks such as recognizing an object in an image. In a neural network, input data is combined with weights to derive output data using activation functions. For example, a neural network may take an image as input data, and output a decision or likelihood that a certain object is in the image. The set of weights used in a neural network can be determined by a training process, in which the neural network can learn how to perform a certain computing task for an application. The training process involves supplying a neural network model with training input data and a corresponding reference output which supports a particular decision (e.g., a detection or a non-detection of an object in an image). The neural network can perform computations to combine the weights with the training input data to generate training output data, and the training output data can be compared against the reference output data to assess the accuracy of the neural network model. During training, different training input data sets can be provided to generate different training output data sets. The weights of the neural network can be adjusted to minimize the differences between the training output data and the reference output data. To improve the likelihood of the neural network generating a correct decision, a large volume of training input data covering a large number of scenarios can be used to train the neural network.

BRIEF DESCRIPTION OF THE DRAWINGS

Various embodiments in accordance with the present disclosure will be described with reference to the drawings, in which.

DETAILED DESCRIPTION

Figure 1:
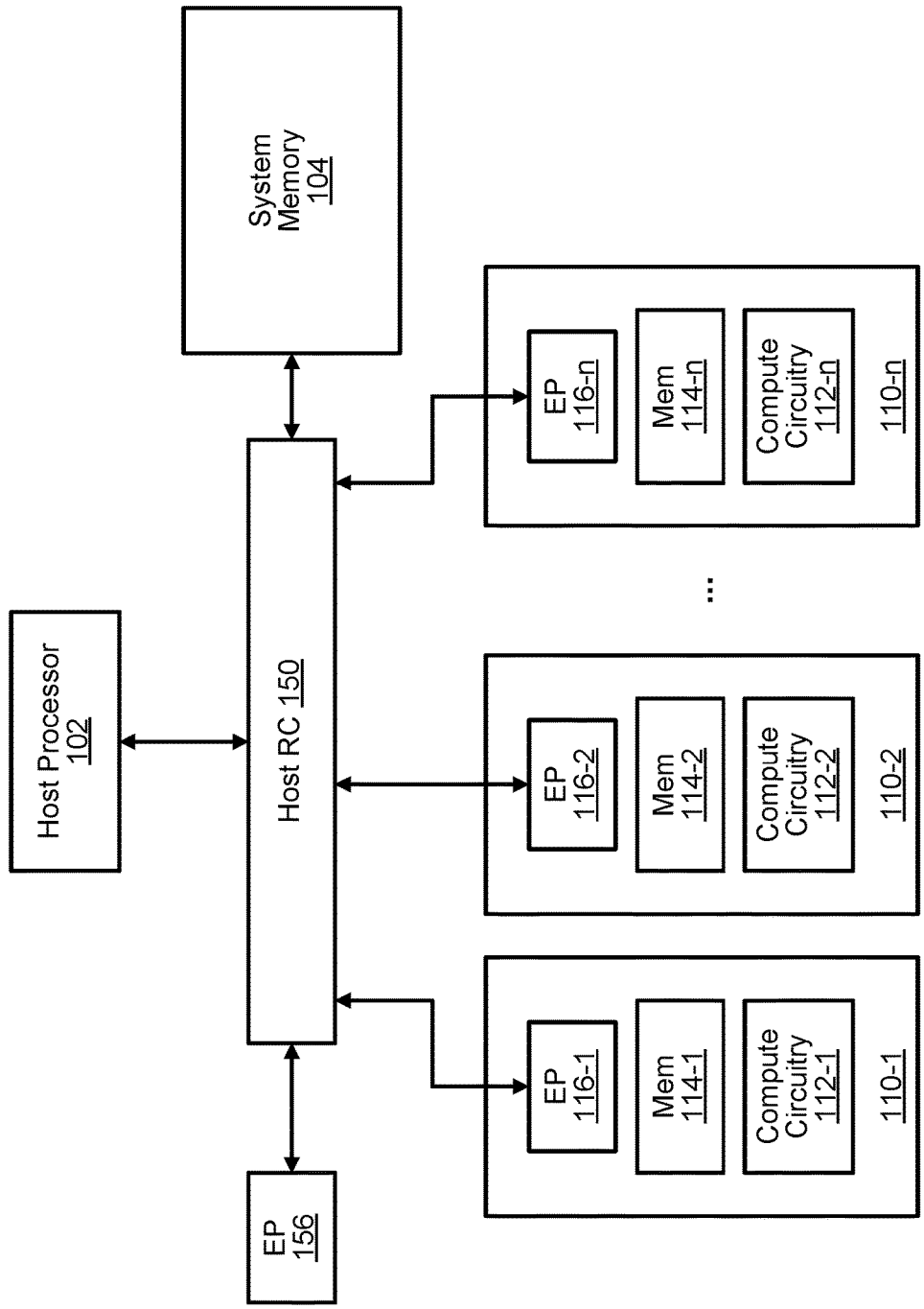
FIG. 1 illustrates an example of a computing system.

A neural network typically includes a number of cascading layers each associated with a set of weights. In an inference operation, an input layer can receive an input data set, combine the input data set with a set of weights (e.g., by multiplying the input data set with the weights and then summing the products) to generate and propagate an intermediate output data set for the next layer in a forward propagation operation. The next layer performs another set of operations on the intermediate output data set from the input layer to generate another intermediate output data set for the next layer, and so on. The forward propagation operations at each layer can represent different stages of extraction and processing of information from the input data set. A decision can then be made based on the output data of the output layer. For example, each neural network layer can extract and/or process features from an image, and a decision of whether an object is in the image can be generated based on the result of processing the extracted features.

The set of weights of the neural network can be generated and/or updated by a training process to improve the likelihood of the neural network outputting a correct decision. An example training process can use a gradient descent scheme. As part of the training process, forward propagation operations can be performed on a training input data set using the set of weights at each neural network layer to generate a training output data set. The training output data set can be compared with a reference output data set to determine an error of the neural network model operating on the training input data, and this error can be used to adjust the weights of the model to improve the accuracy of the neural network.

As part of the training process, each neural network layer can perform backward propagation operations to adjust the set of weights at each neural network layer. During backward propagation, the error or the difference between the training output data set and the reference output data set is propagated backward from the output layer back towards the input layer. At each layer, a set of weight gradients is calculated based on the error to determine the amount of adjustment to make to each weight value. One iteration of the training process is completed when the weights of each layer have been adjusted. The next iteration of the training process can then be performed with the updated weights, and the training process can be repeated for a number of iterations until a loss objective is achieved, such as minimizing the error or until the error lowers to a certain threshold.

The training process can be time-consuming due to data dependency among the operations involved. Moreover, the training process typically involves supplying the neural network with multiple sets of training data to cover different input scenarios, such that the neural network can be trained to provide a correct decision over a wide range of inputs. Having a large number of training data sets to process further increases the training time. The training process may also require a higher precision than the inference operation, resulting in additional strain on the computational resources.

One way to accelerate the training process, is to use a distributed training system in which the training process is spread across multiple processing nodes. In distributed training based on data parallelism, the training input data can be split into multiple portions, with each portion to be processed by a processing node using the same neural network model and the same set of initial weights. Each processing node can perform the forward and backward propagation operations independently based on its portion of the training input data to generate a set of weight gradients for each neural network layer. At each iteration of the training process, each set of weight gradients can be synchronized among the processing nodes using a process called gradient exchange.

In some implementations, one of the processing nodes can act as a parameter server to collect the gradients from the other processing nodes, and update the weights by aggregating the gradients from all processing nodes (e.g., by averaging the gradients). The processing node acting as the parameter server can then distribute the updated weights to the other processing nodes. In some implementations, collective compute operations including all-reduce, all-gather, etc. can be used to exchange gradients between the processing nodes, and each processing node updates its own weights based on the gradients exchange process. In either scenario, data (e.g., weights, gradients, etc.) computed or generated at a processing node is sent to other processing nodes in the distributed training system.

For large neural network models and especially for deep learning neural networks, the number of weights and/or gradients that are exchanged between processing nodes can range from tens of thousands to millions of floating-point numbers. Furthermore, for large training sets, the number of times that such data exchanges take place over the course of training to converge the neural network model can easily scale the amount of data being exchanged to hundreds or thousands times that of the model size. This large amount of data being exchanged can create a memory bandwidth burden on the processing nodes and reduce performance of the system. For example, transferring a piece of data from a source processing node to four other processing nodes may require four separate memory accesses to the internal memory of the source processing node for each of the four transfers, even though the four transfers are providing the same data.

To reduce the memory bandwidth demands for such communication patterns, the techniques disclosed herein utilize switches with multicast capabilities to reduce the amount of memory accesses to the internal memory of the processing nodes. Any data (e.g., weights, gradients, etc.) that are distributed from a source processing node to multiple other processing nodes can be read just once from the internal memory of the source processing node, and be provided to a switch interconnecting the processing nodes. The multicast capabilities of the switch are then utilized to multicast the data to multiple target processing nodes. This eliminates repeated accesses to the internal memory of the source processing node for the same data, and helps alleviate the memory bandwidth demands on the processing nodes.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a block diagram of an example of a computing system 100. Computing system 100 can be a host computer (e.g., a server computer) that includes a host processor 102 and system memory 104. In some implementations, the components of computing system 100 can be housed in a chassis or on a rack. Host processor 102 can be a general-purpose processor that is capable of executing software code. Processor 102 may include multiple processing cores, and can be used to manage the operations of computing system 100. System memory 104 provides temporary or long-term storage for data that may be used by computing system 100. System memory 104 may include Dynamic Random Access Memory (DRAM) (e.g., Synchronous DRAM (SDRAM), Double Data Rate (DDR) SDRAM, etc.) and/or other types of memory such as Static Random Access Memory (SRAM), flash memory, etc.

Computing system 100 includes multiple neural network accelerators 110-1 to 110-n that are each capable of performing neural network computations. As such, computing system 100 can be used as a distributed training system, and each of the multiple neural network accelerators 110-1 to 110-n can act as a processing node of the distributed training system. In some implementations, each of neural network accelerators 110-1 to 110-n can be a single-chip integrated circuit device. In other words, the components of a neural network accelerator can be integrated within a single semiconductor chip. Each of neural network accelerators 110-1 to 110-n may have the same or similar structure. However, implementation of computing system 100 need not be limited to using the same type of neural network accelerators, and neural network accelerators of different types or from different manufactures can be implemented in computing system 100.

Taking neural network accelerator 110-1 as an example, neural network accelerator 110-1 includes compute circuitry 112-1 and a memory 114-1. Compute circuitry 112-1 includes circuitry that is tailored for performing neural network computation such as matrix multiplication operations. Compute circuitry 112-1 may include, for example, a processing engine array of processing elements arranged in rows and columns. Each of the processing element can be a multiply-and-accumulate circuit that multiplies a feature map input value with a weight value, and add the results to the output of a previous processing element to generate a partial sum output for the next processing element. Processing engine array can be implemented, for example, as a systolic array. Compute circuitry 112-1 may also include other compute engines such as an activation engine and/or a pooling engine. In some implementations, neural network accelerator 110-1 may include multiple compute circuitry 112-1 to allow neural network accelerator 110-1 to perform parallel computations.

Memory 114-1 is a local memory subsystem used by neural network accelerator 110-1. Memory 114-1 may include multiple memory components, and each memory component may include multiple memory blocks and/or memory partitions. Memory 114-1 is configured to store weights used by compute circuitry 112-1, for example, in a state buffer memory. The state buffer memory may also store feature map input values. During operation, the weights can be loaded from the memory 114-1 into compute circuitry 112-1, and feature map input values can be shifted into compute circuitry 112-1 from memory 114-1 to generate partial sum results. Memory 114-1 can also be configured to store the outputs of compute circuitry 112-1, for example, in a partial sum results buffer memory.

To provide a communication interface for neural network accelerator 110-1 to communication with other components of computing system 100, neural network accelerator 110-1 may include an endpoint peripheral bus interface circuit 116-1 (may simply be referred to as an endpoint or endpoint device). For example, endpoint 116-1 can be implemented as a peripheral component interconnect express (PCIe) endpoint device that supports the PCIe protocol or similar derivatives. An endpoint device can generate and/or respond to data transactions. For example, endpoint 116-1 can initiate data transactions (e.g., read, write, etc.) as a requester, and/or respond to the data transactions as a completer, and may do so on behalf of another component such as neural network accelerator 110-1. Endpoint 116-1 can maintain a set of configuration registers that can be used to identify endpoint 116-1 to other components, and to provide information about the endpoint's capabilities and status. Each endpoint is initialized with a device identifier (e.g., requester identifier and/or completer identifier), which may include a bus number, a device number, and/or a function number. In PCIe implementations, an endpoint may implement a type 0 configuration space.

Endpoint 116-1 is coupled to memory 114-1, and can be used to connect neural network accelerator 110-1 to an interconnect fabric topology to allow other components to read from or write to memory 114-1. Endpoint 116-1 may access data (e.g., read or write) of memory 114-1, for example, using direct memory access (DMA). The interconnect fabric can provide point-to-point connections between the devices connected to the fabric, and may include a routing system for passing packets and/or messages between the devices. Data transactions can be spread across multiple physical links in the interconnect fabric and may pass through one or more components before reaching the destination. The connections between devices in the fabric may also be referred to as peripheral buses or peripheral bus links. Endpoint 116-1 can provide support for multi-layer protocol stack processing including a transaction layer to generate and process packets, a data link layer to provide communication link management and data integrity, and a physical layer to generate communication signals carried on the peripheral bus links.

Computing system 100 also includes a host root complex 150 that connects host processor 102 and system memory 104 to the interconnect fabric. Host root complex 150 provides multiple ports for connecting the interconnect fabric to a number of endpoint devices, such as neural network accelerators 110-1 to **110-*n* and/or other endpoints such as endpoint 156. Each port can be connected to an endpoint device or to a switch that forms a subhierarchy. Host root complex 150 can generate transaction requests on behalf of host processor 102. Host root complex 150 can also generate configuration, memory, and input/output requests, and can lock transaction requests on the interconnect fabric. Host root complex 150 is operable to send packets out of any of its ports, and receives packets on its ports which can be forwarded to host processor 102 and/or system memory 104. Host root complex 150 is also operable to route packets from one port to another to support transfers to and from other endpoints such as neural network accelerators 110-1 to 110-*n*. Host root complex 150 can also be used to implement hot pluggable controllers, power management controller, interrupt controller, etc. Similar to an endpoint, host root complex 150** may also have a bus number, device number, and/or function number (e.g., 0x0), which can be used to form a requester identifier and/or completer identifier for its transactions. In PCIe implementations, a root complex may implement a type 1 configuration space.

During distributed training, each of neural network accelerators 110-1 to **110-*n* can be loaded with the same neural network model and set of initial weights. The training data can be divided amongst the neural network accelerators 110-1 to 110-*n* acting as processing nodes so that different sets of training data can be processed in parallel to reduce training time. In order to aggregate the gradients computed over each training iteration and update the weights of the model, one or more of neural network accelerators 110-1 to 110-*n*** may distribute data associated with the weights (e.g., gradient values including aggregated gradients that are used to update the weights, etc.) to the other neural network accelerators. In some implementations, one of the neural network accelerators may collect the gradients to compute the updated weight values, and then distribute the updated weight values to the other neural network accelerators.

Figure 2:
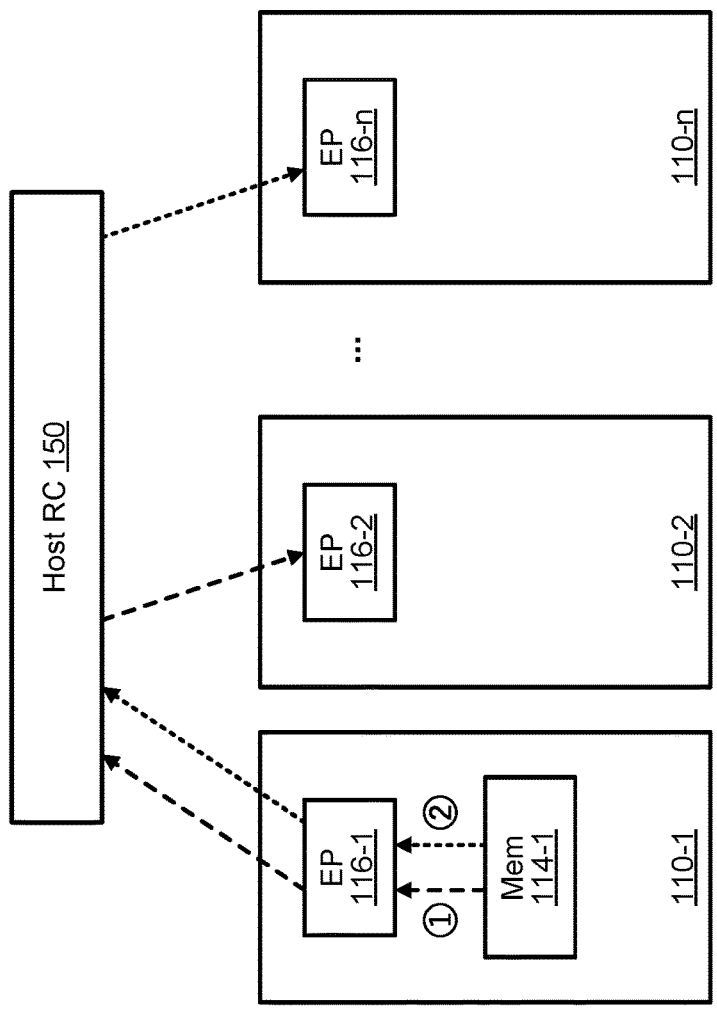
FIG. 2 illustrates an example of distributing data in a computing system.

FIG. 2 illustrates an example of one technique to distribute data from neural network accelerator 110-1 to the other neural network accelerators in computing system 100. In order to avoid obscuring the data transmission paths, various components of computing system 100 that were shown on FIG. 1 have been omitted in FIG. 2. It should be understood that the structure of computing system 100 shown in FIG. 2 has not changed from FIG. 1.

Referring to FIG. 2, when neural network accelerator 110-1 initiates a data transaction to send data from memory 114-1 to neural network accelerator 110-2, the data is read from memory 114-1 and provided to endpoint 116-1 for transmission to neural network accelerator 110-2 as indicated by the long dash arrow labeled ①. Endpoint 116-1 then generates a memory write request packet. The memory write request packet may include a format and/or type field to indicate a memory write operation, a requester identifier indicating endpoint 116-1 is the sender of the packet, a target address associated with endpoint 116-2 for neural network accelerator 110-2, and the data that is being distributed. The memory write request packet may include other information not specifically described. Endpoint 116-1 then transmits the memory write request packet to host root complex 150, which then forwards the memory write request packet to endpoint 116-2 based on the address in the packet.

To distribute the same data to neural network accelerator **110-*n*, neural network accelerator 110-1 repeats the same process. The data is read from memory 114-1 and provided to endpoint 116-1 for transmission to neural network accelerator 110-*n* as indicated by the short dash arrow labeled ②. Similarly, endpoint 116-1 then generates a memory write request packet, but with a target address associated with endpoint 116-*n* for neural network accelerator 110-*n*, and sends the packet towards host root complex 150, which then forwards the memory write request packet to endpoint 116-*n*. As can be seen, the number of accesses made to memory 114-1 to distribute a piece of data scales with the number of target components. For highly distributed systems with a large number of processing nodes, the memory accesses can put a strain on the memory bandwidth of the neural network accelerator 110-1. In some implementations, each of neural network accelerators 110-1 to 110-*n*** may distribute data to the other processing nodes in a similar manner. As such, the strain on memory bandwidth is not limited to just one processing node, but may be applied to the entire system during the course of training.

Figure 3:
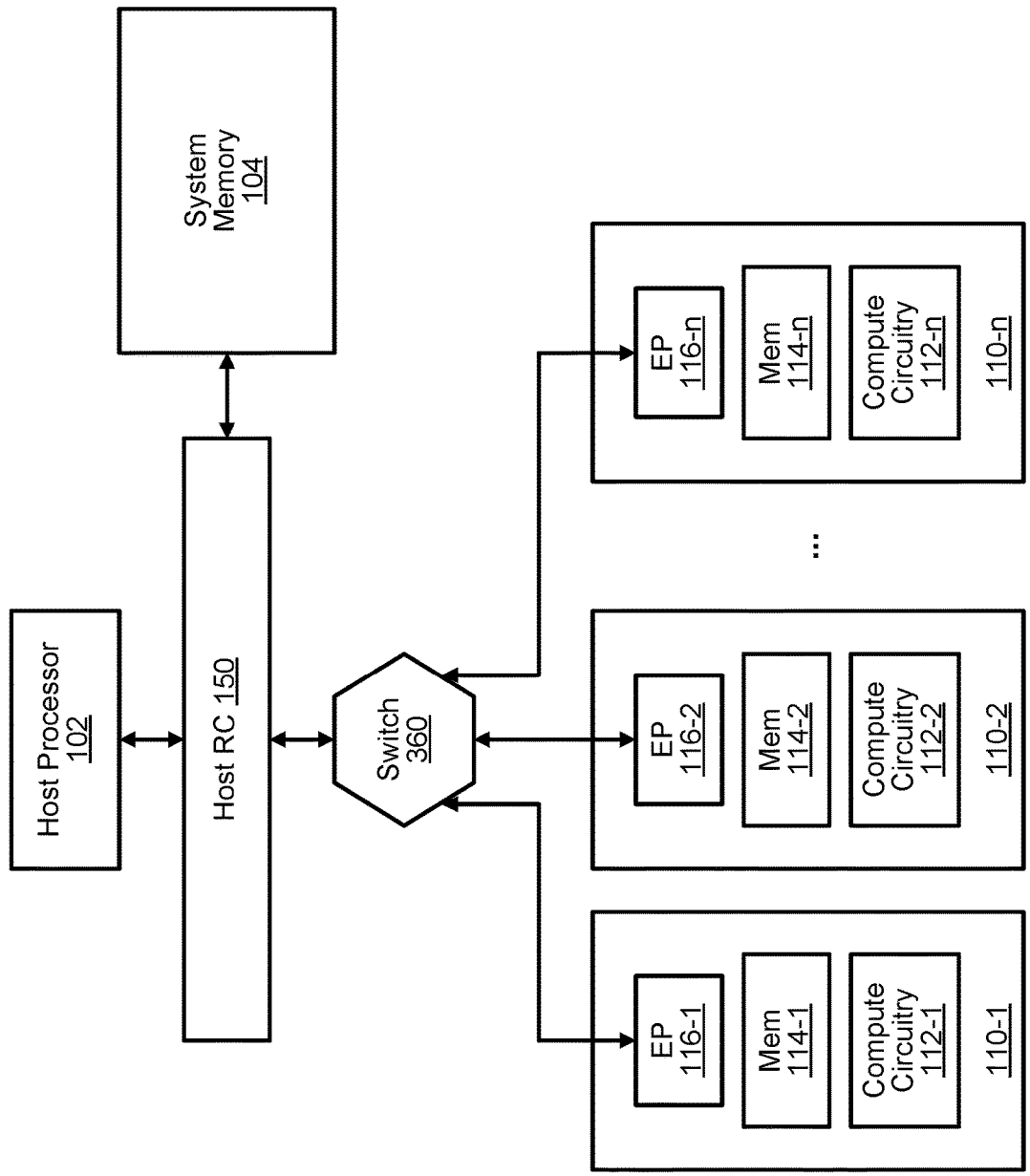
FIG. 3 illustrates another example of a computing system.

To alleviate the strain on the local memories of neural network accelerators 110-1 to **110-*n*, a peripheral bus multicast switch can be implemented. FIG. 3 illustrates an example of a computing system 300 that includes a peripheral bus multicast switch 360 (which may simply be referred to as a multicast switch). In computing system 300, components having the same reference number as FIG. 1 are similar to those describe above with FIG. 1, and thus a detailed description of which need not be repeated. Referring to FIG. 3, multicast switch 360 in computing system 300 can be external to neural network accelerators 110-1 to 110-*n*. Multicast switch 360 includes multiple ports which can each be connected to other components. Multicast switch 360 may include an upstream port that is coupled to a connection towards a root complex (e.g., host root complex 150), and multiple downstream ports that are each coupled to a connection towards an endpoint (e.g., endpoints 116-1 to 116-*n*). Multicast switch 360 functions as a bridge between various components, including host root complex 150 and endpoints 116-1 to 116-*n*. In some implementations, multicast switch 360 includes a bridge component associated with each port, and the bridge component is coupled between the corresponding port and an internal virtual peripheral bus. Multicast switch 360 may route transactions between endpoints 116-1 to 116-*n*, and/or between the endpoints 116-1 to 116-*n* and host root complex 150. Multicast switch 360 may also provide arbitration to prioritize incoming and outgoing data transactions. Endpoints 116-1 to 116-*n* and/or host root complex 150 may treat multicast switch 108** as another transaction requester and/or completer.

Multicast switch 360 include multicast capabilities that can take a received packet and forward the packet to multiple targets. In PCIe implementations, multicast switch 360 can be a multicast capable PCIe switch. To enable such capabilities, multicast switch 360 includes a multicast address table that maps a multicast address range to multicast address groups. Each multicast address in the multicast address range is mapped to a set of multicast target in a multicast address group. Hence, when a memory write request packet containing an address in the multicast address range (may be referred to as a memory write multicast request packet) is received by multicast switch 360, multicast switch 360 can look up a set of targets using the address in the memory write multicast request packet, and forward the data contained in the memory write multicast request packet to the set of target devices.

By configuring different groups for different multicast addresses in the multicast address table, a selective multicast scheme can be implemented. For example, a first multicast address can be defined for multicasting to a first set of peripheral bus ports such as endpoints 116-2 to **116-*n*, and a second multicast address can be defined for multicasting to a second set of peripheral bus ports such as endpoints 116-1 and endpoints 116-3 (not shown) to 116-*n* in the multicast address table of multicast switch 360. Neural network accelerator 110-1 can distribute data to endpoints 116-2 to 116-*n* by having endpoint 116-1 issue a memory write multicast request packet containing the first multicast address. Similarly, neural network accelerator 110-2 can distribute data to endpoint 116-1 and endpoints 116-3 to 116-*n* by having endpoint 116-2** issue a memory write multicast request packet containing the second multicast address.

Figure 4:
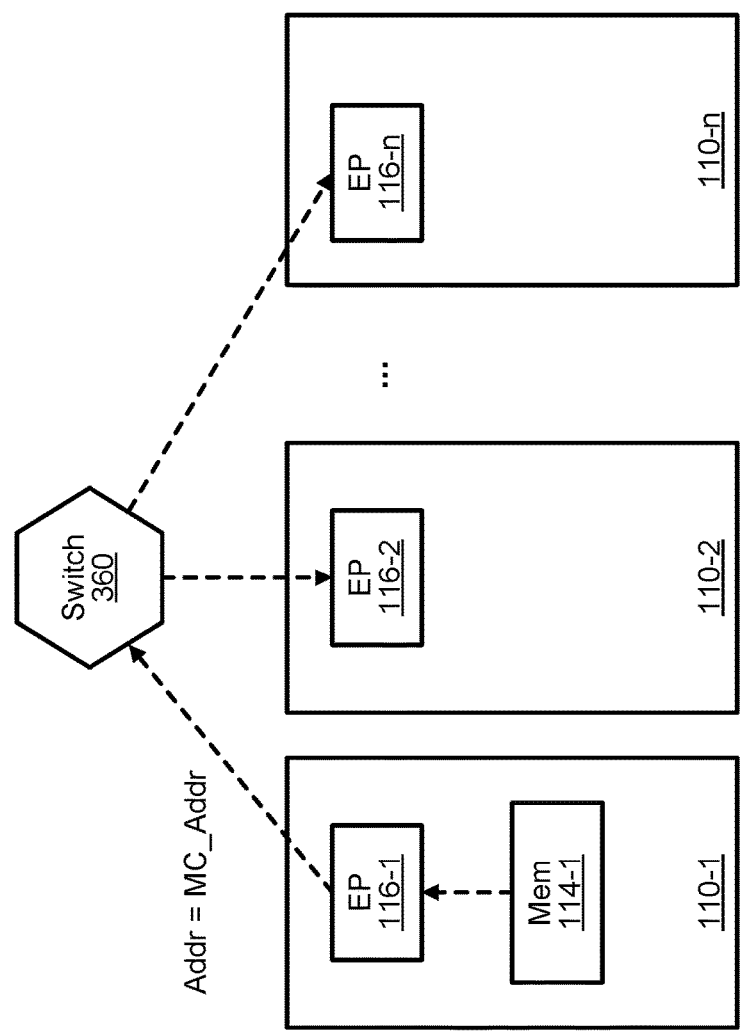
FIG. 4 illustrates another example of distributing data in a computing system.

FIG. 4 illustrates an example of a technique to distribute data from neural network accelerator 110-1 to the other neural network accelerators in computing system 300. In order to avoid obscuring the data transmission paths, various components of computing system 300 that were shown on FIG. 3 have been omitted in FIG. 4. It should be understood that the structure of computing system 300 shown in FIG. 4 has not changed from FIG. 3.

Referring to FIG. 4, when neural network accelerator 110-1 initiates a data transaction to send data from memory 114-1 to neural network accelerators 110-2 to **110-*n*, the data is read from memory 114-1 and provided to endpoint 116-1. Endpoint 116-1 then generates a memory write multicast request packet by including a multicast address MC_Addr in the address field of the packet. Endpoint 116-1 then transmits the memory write multicast request packet to multicast switch 360**.

Multicast switch 360 includes a multicast address table that maps the multicast address MC_Addr to a set of multicast targets corresponding to peripheral bus ports such as endpoints 116-2 to **116-*n* of neural network accelerators 110-2 to 110-*n*. Multicast switch 360 is thus configured to forward multiple packets containing the data from the memory write multicast request packet, with each packet being forwarded to a target in the set of multicast targets (e.g., endpoints 116-2 to 116-*n*) mapped to the multicast address MC_Addr. Accordingly, multicast switch 360 generates a packet containing the data (e.g., gradients values, weight values, etc.) being distributed from neural network accelerator 110-1 to each of neural network accelerators 110-2 to 110-*n*, and sends such a packet to each of endpoints 116-2 to 116-*n***.

As compared to computing system 100 of FIG. 2, by incorporating multicast switch 360 in computing system 300, neural network accelerator 110-1 is able to distribute a piece of data to as many other neural network accelerators as there are on the interconnect fabric by using a single access to its local memory 114-1. This reduction in the bandwidth strain on the local memory is also applicable to each of the neural network accelerators in the system that exchanges data with multiple other components.

Figure 5:
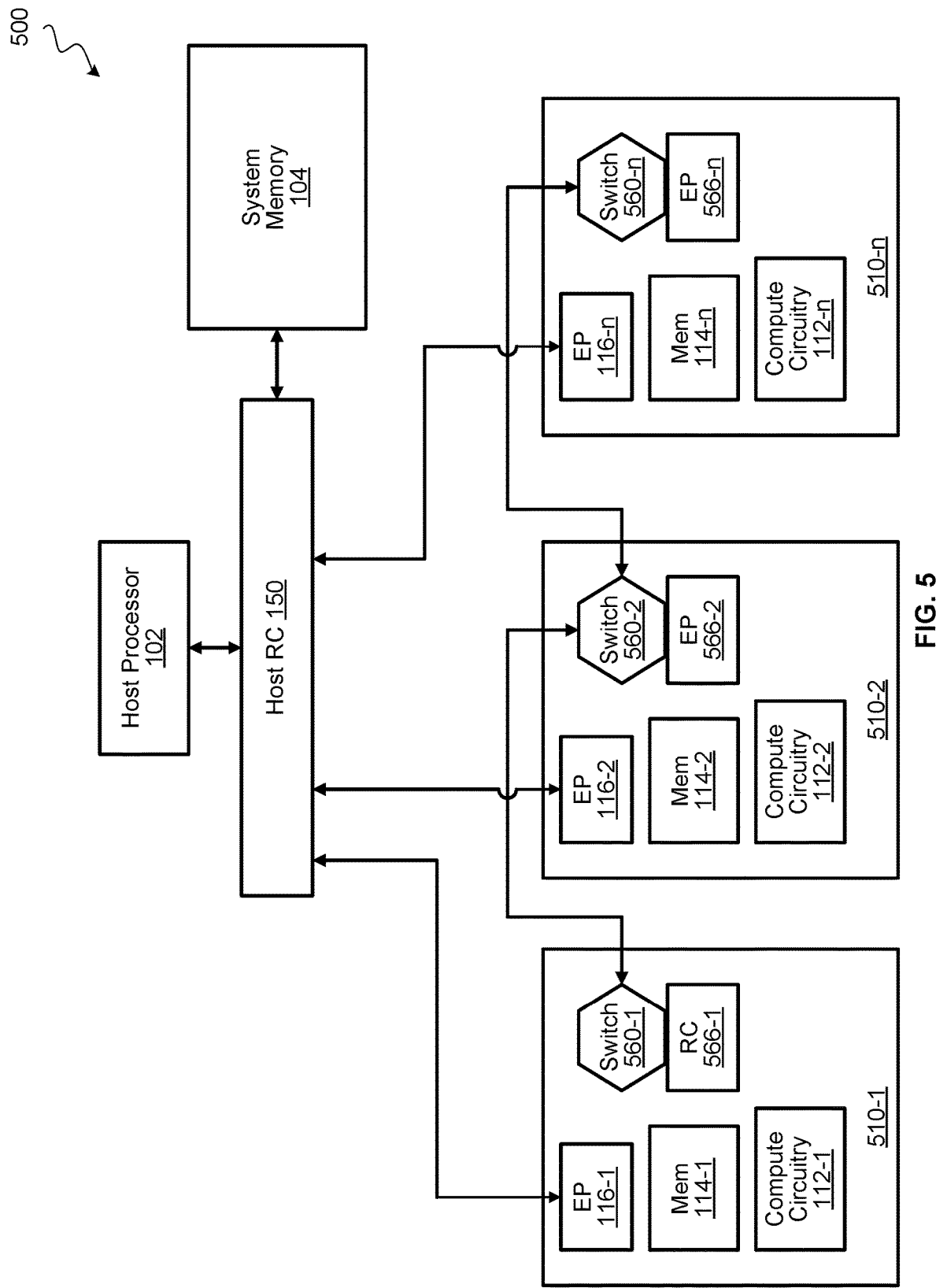
FIG. 5 illustrates a further example of a computing system.

FIG. 5 illustrates an example of a computing system 500 that includes an integrated multicast switch in each neural network accelerator. In computing system 500, components having the same reference number as FIG. 3 are similar to those describe above with FIG. 3, and thus a detailed description of which need not be repeated. Referring to computing system 300 shown in FIG. 3, multicast switch 360 is external to each neural network accelerator. However, some computing systems may lack a peripheral bus switch, or may lack a peripheral bus switch capable of perform multicast operations. As such, rather than relying on the host system, a neural network accelerator can be designed with an integrated multicast switch.

Referring now to FIG. 5, each of the neural network accelerators 510-1 to **510-*n* may include a corresponding multicast switch integrated with the neural network accelerator, and each of the multicast switch may include an embedded dual-mode peripheral bus interface circuit that is programmable to operate as a root complex or an endpoint. For example, neural network accelerator 510-1 may include multicast switch 560-1 integrated with neural network accelerator 510-1. In other words, in implementations in which neural network accelerator 510-1 is a single chip integrated circuit device, multicast switch 560-1 is integrated in that single chip integrated circuit device. Multicast switch 560-1 may also include a peripheral bus interface circuit 566-1 embedded with multicast switch 560-1**.

As mentioned above, peripheral bus interface circuit 566-1 can be a dual-mode peripheral bus interface circuit that is programmable to operate as a root complex or an endpoint device. For example, peripheral bus interface circuit 566-1 may include both a type 0 and a type 1 configuration space, and may provide both root complex and endpoint functionalities as described herein. In some implementations, a configuration bit or an input signal can be used to select between operating peripheral bus interface circuit 566-1 as a root complex or as an endpoint.

In the example computing system 500 shown in FIG. 5, peripheral bus interface circuit 566-1 of neural network accelerator 510-1 is programmed to operate as a root complex, and the upstream port of multicast switch 560-1 is thus coupled to peripheral bus interface circuit 566-1 of neural network accelerator 510-1 operating as a root complex. Each of the other neural network accelerators 510-2 to **510-*n* also includes an integrated multicast switch and an embedded peripheral bus interface circuit. However, the peripheral bus interface circuits 566-2 to 566-*n* of neural network accelerators 510-2 to 510-*n* are programmed to operate as an endpoint. The peripheral bus interface circuits 566-1 to 566-*n* are also each coupled to respective memories 114-1 to 114-*n*** of the corresponding neural network accelerator. The functionalities of the multicast switches, root complex, and endpoints are similar to those discussed above, and thus a detailed description of which need not be repeated.

At the system level, by having multicast switches integrated with each neural network accelerator and operating peripheral bus interface circuit 566-1 as a root complex, neural network accelerators 510-1 to 510-n may implement a set of peripheral bus links amongst themselves to interconnect neural network accelerators 510-1 to 510-n. For example, peripheral bus interface circuit 566-1 may act as the root complex for the peripheral bus links connecting the multicast switches 560-1 to 560-n in a ring or serial type typology. In some implementations, this set of peripheral bus links may operate independently of the peripheral bus links connected to the host root complex 150. Neural network accelerators 510-1 to 510-n may still maintain endpoints 116-1 to 116-n with host root complex 150. In some implementations, the set of peripheral bus links managed by peripheral bus interface circuit 566-1 can be dedicated for gradients, weights, or other neural network data exchange between neural network accelerators 510-1 to 510-n, and the host root complex links can be used for other general purpose peripheral bus communications.

Figure 6:
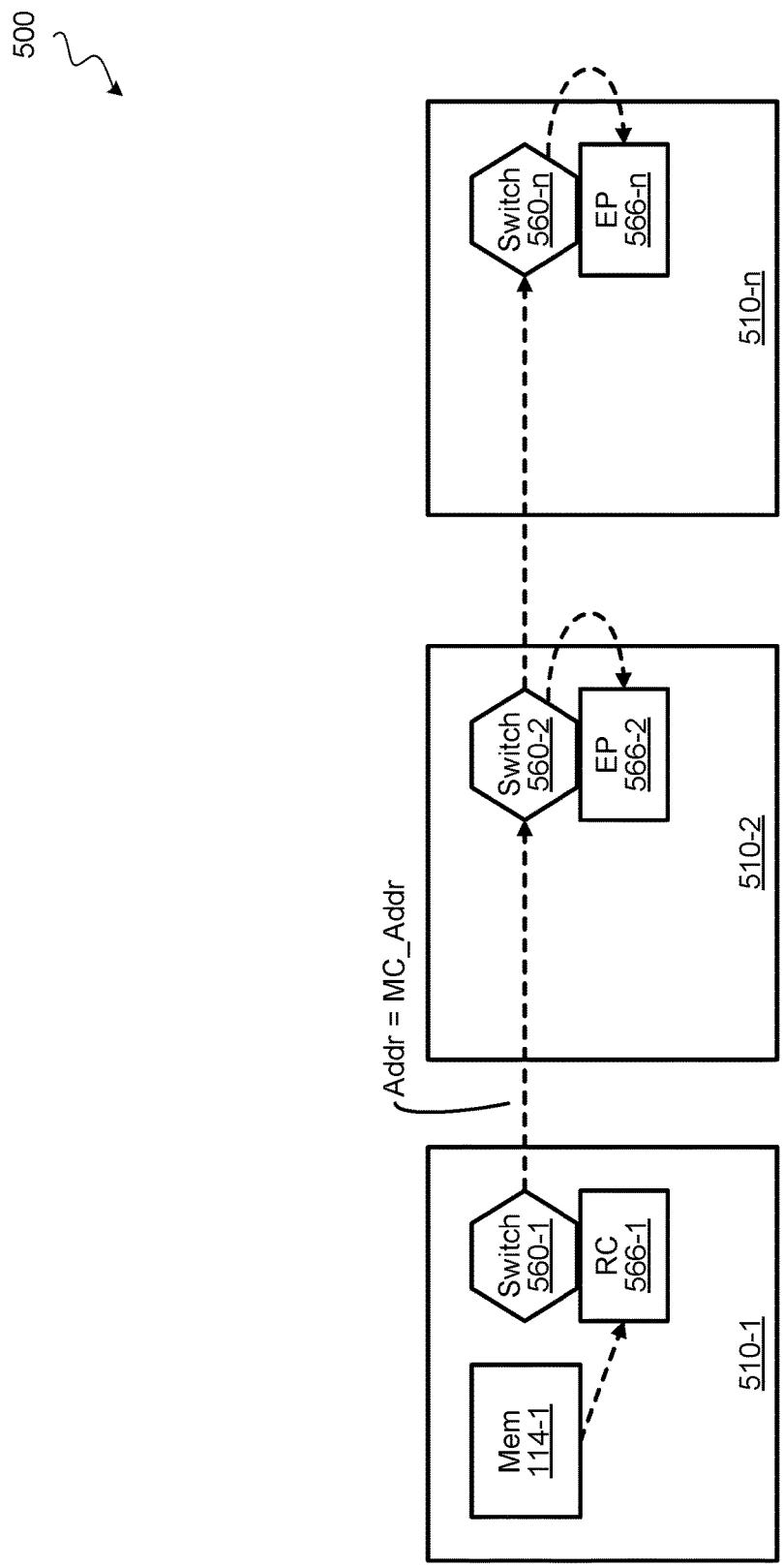
FIG. 6 illustrates a further example of distributing data in a computing system.

FIG. 6 illustrates an example of a technique to distribute data from neural network accelerator 510-1 to the other neural network accelerators in computing system 500. In order to avoid obscuring the data transmission paths, various components of computing system 500 that were shown on FIG. 5 have been omitted in FIG. 6. It should be understood that the structure of computing system 500 shown in FIG. 6 has not changed from FIG. 5.

Referring to FIG. 6, when neural network accelerator 510-1 initiates a data transaction to send data from memory 114-1 to neural network accelerators 510-2 and 510-n, the data is read from memory 114-1 and provided to root complex 566-1. Root complex 566-1 then generates a memory write multicast request packet by including a multicast address MC_Addr in the address field of the packet. Switch 560-1 embedded with root complex 566-1 then transmits the memory write multicast request packet to multicast switch 560-2.

Multicast switch 560-2 includes a multicast address table that maps the multicast address MC_Addr to a set of multicast targets corresponding to peripheral bus ports such as endpoints 566-2 and 566-n of neural network accelerators 110-2 and 110-n. Multicast switch 560-2 is thus configured to forward multiple packets containing the data from the memory write multicast request packet, with each packet being forwarded to a target in the set of multicast targets (e.g., endpoints 566-2 to 566-n) mapped to the multicast address MC_Addr. Accordingly, multicast switch 560-2 generates a packet containing the data (e.g., gradients values, weight values, etc.) being distributed from neural network accelerator 510-1 to each of neural network accelerators 510-2 and 510-n, and sends such a packet to each of endpoints 566-2 and 566-n.

In some implementations, if there are additional neural network accelerators having a peripheral bus link coupled serially between neural network accelerators 510-2 and 510-n, the data being distributed can be cascaded down each neural network accelerator. For example, the multicast address table in multicast switch 560-2 may map the multicast address MC_Addr to endpoint 566-2 and a second multicast address that is mapped in the multicast switch of the next neural network accelerator. This second multicast address is then mapped in the multicast switch of the next neural network accelerator to an endpoint in the next neural network accelerator and a third multicast address that is mapped down the line, and so on. In this manner, each multicast switch can be configured to multicast a received packet to the embedded endpoint of the multicast switch and to the next multicast switch.

The integrated multicast switch in each neural network accelerator may also allow other peripheral bus topologies to be formed. For example, instead of coupling the multicast switches of the neural network accelerators in series, multicast switches 560-2 and 560-n can be connected to multicast switch 560-1 directly to create a branch topology branching out from switches 560-1. In some implementations, each of the embedded peripheral bus interface circuits 566-1, 566-2, and 566-n can be programmed to operate as an endpoint, and a peripheral bus link may connect, for example, multicast switch 560-1 to host root complex 150 such that the multicast switches are managed by host root complex 150. Moreover, it is not necessary to have every neural network accelerator to have an integrated multicast switch because endpoints of neural network accelerators that lack a switch can be connect to ones that have a switch. In any of these scenarios, data being distributed to multiple process node may require only a single memory access on the source processing node.

Figure 7:
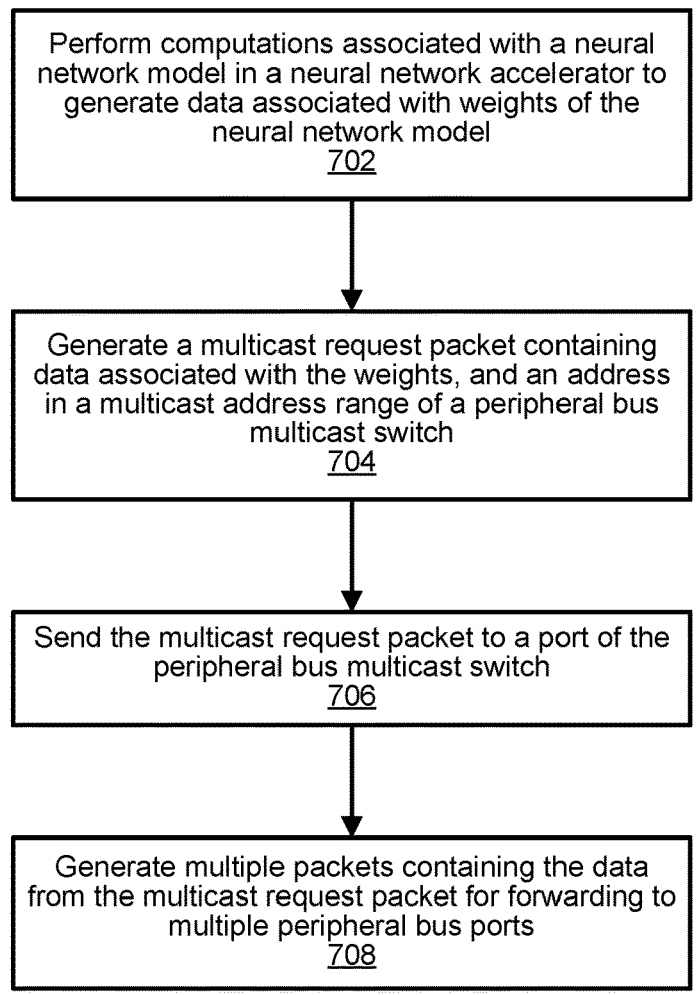
FIG. 7 illustrates a flow diagram of an example of a data distribution process.

FIG. 7 illustrates an example of a flow diagram of a process 700 for distributing data in a computing system. Process 700 can be performed, for example, in a computing system operating as a distributed training system. In some implementations, process 700 can be implemented as instructions stored on a computer readable medium that can be executed by one or more processors to perform the steps of process 700.

Process 700 may begin at block 702 by performing computations associated with a neural network model in a neural network accelerator to generate data associated with weights of the neural network model. The computations can be performed, for example, as part of a training process. The neural network accelerator may operate as a processing node in a set of processing nodes that collectively perform the training process. In some implementations, the data associated with weights being computed may include gradient values that are used to update the weights. In some implementations, the data associated with weights being computed may be the weight values themselves.

At block 704, a multicast request packet is generated. The multicast request packet can be a memory write packet, and may contain the data associated with the weights, and an address in a multicast address range of a peripheral bus multicast switch. In some implementations, the multicast request packet may adhere to a bus protocol such as PCIe. For example, the packet being generated may include a PCIe transaction layer packet indicating a memory write operation.

At block 706, the multicast request packet is sent to a port of the peripheral bus multicast switch. The peripheral bus multicast switch may include a multicast address table that maps the address in the multicast request packet to a set of multicast targets. In some implementations, the peripheral bus multicast switch can be integrated with the neural network accelerator in a single chip integrated circuit device, or can be external to the neural network accelerator.

At block 708, the peripheral bus multicast switch generates multiple packets containing the data from the multicast request packet for forwarding to multiple peripheral bus ports. The target peripheral bus ports may include one or more endpoints, one or more ports of a peripheral bus switch, a root complex, or a combination thereof. For example, each of the multiple peripheral bus ports may correspond to an endpoint of a neural network accelerator.

The peripheral bus multicast switch may generate the packets, for example, by looking up the target addresses in the multicast address table that are mapped to the address in the multicast request packet. In some implementations, the packets are generated by replacing the address in the multicast request packet with a target address. The generated packets may then be forwarded to the target peripheral bus ports to provide their corresponding neural network accelerators (e.g., operating as the other processing nodes in the training system) with the data being distributed.

Although certain aspects of the present disclosure have been described in the context of distributing data associated with weights such as gradient values and/or the weight values themselves, the techniques disclosed herein can also be used by the neural network accelerators to distribute other types of data. For example, in model parallel processing, a set of intermediate outputs can be provided to two neural network accelerators implementing a branch in the neural network model, and the techniques disclosed herein can be used to distribute the intermediate outputs. Moreover, the techniques disclosed herein can also be used in other integrated circuit devices (e.g., graphics processing units, digital signal processing units, etc.) to facilitate distribution of data in collective compute environments.

Figure 8:
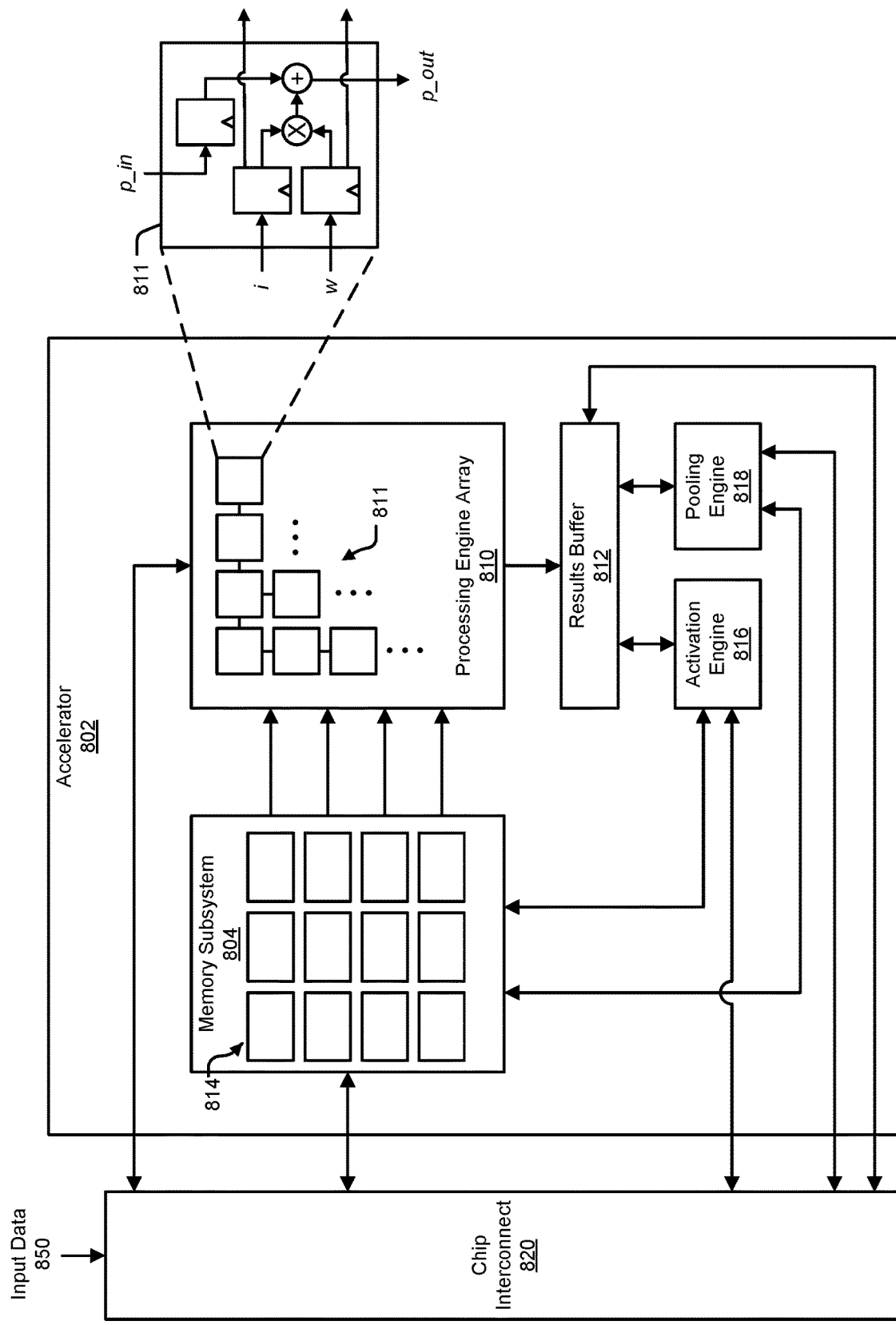
FIG. 8 illustrates a block diagram of an example of an integrated circuit device.

FIG. 8 is a block diagram illustrating an example of an integrated circuit device that can include an accelerator 802. In various examples, the accelerator 802, for a set of input data (e.g., input data 850), can execute computations using a processing engine array 810, an activation engine 816, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 (e.g., implementing a state buffer) can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w', where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p in, provided either from another processing engine 811 or from a previous round of computation by the processing engine array 810. When starting a computation for a new set of input data, the top row of the processing engine array 810 can receive a fixed value for p in, such as zero. As illustrated by this example, i and w are multiplied together and the result is summed with p in to produce a new partial sum, p out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
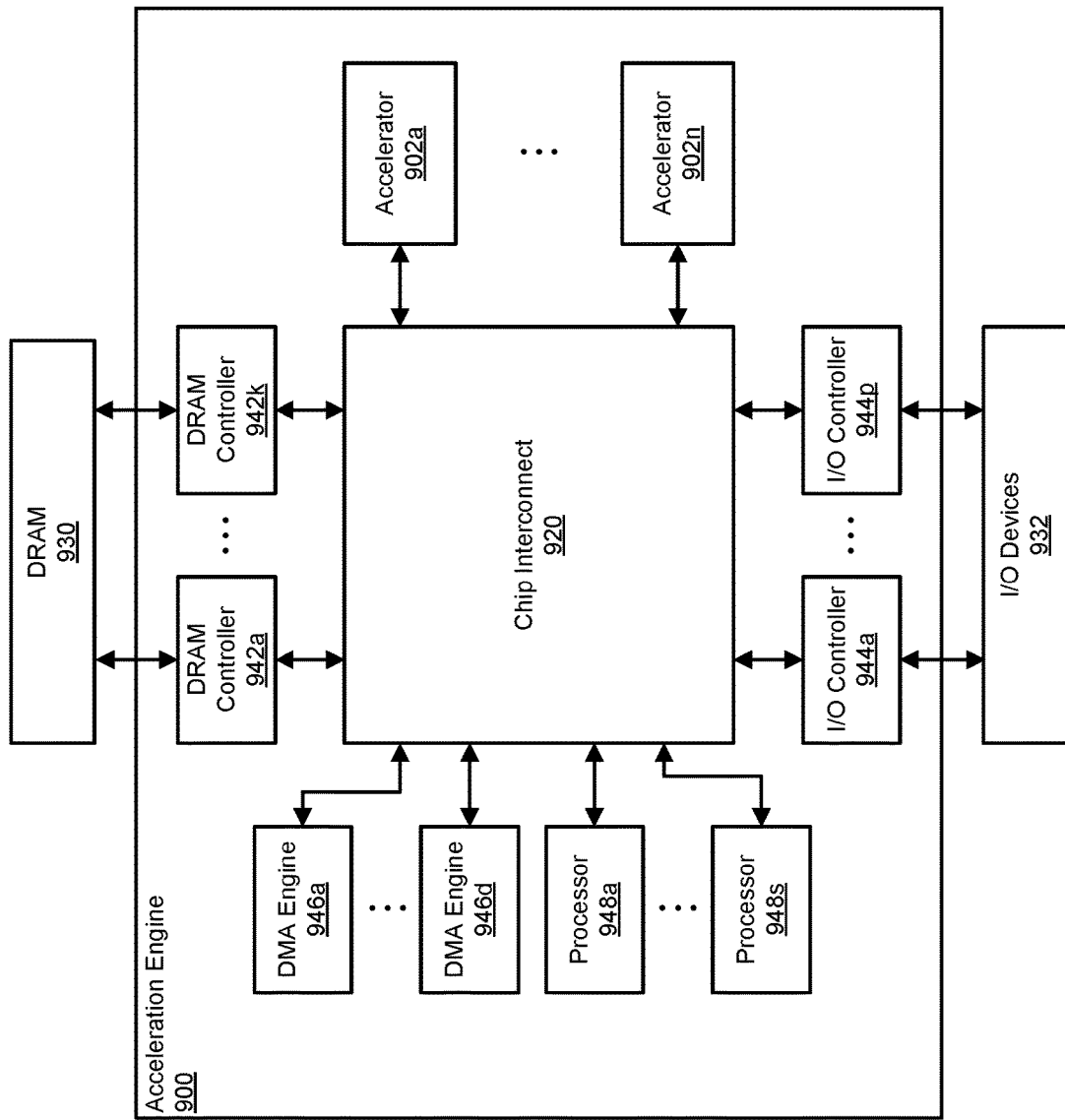
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n are for particular types of operations, so that the accelerators 902a-902n can perform the operations much faster than when similar operations are performed by a general-purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the accelerators 902a-902n is a graphics accelerator) or can be different (e.g., the accelerators 902a-902n include a graphics accelerator, a floating-point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
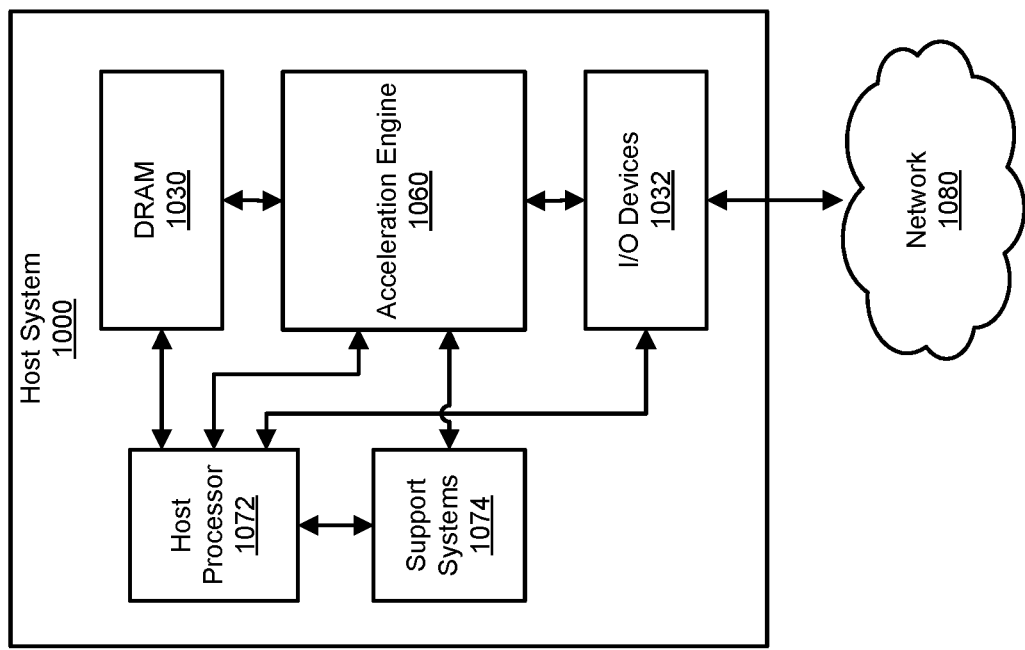
FIG. 10 illustrates a block diagram of an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general-purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
    a set of peripheral bus links; and
    a plurality of neural network accelerators coupled to the set of peripheral bus links, wherein each of the plurality of neural network accelerators includes:
        a processing engine array having multiply-and-accumulate circuits arranged in rows and columns;
        a memory configured to store weights used by the processing engine array;
        a peripheral bus interface circuit coupled to the memory; and a peripheral bus multicast switch coupled between the peripheral bus interface circuit and a peripheral bus link, wherein a neural network accelerator is configured to distribute data associated with the weights to other neural network accelerators by sending, from the peripheral bus multicast switch acting as a first peripheral bus multicast switch, a memory write multicast request packet containing the data to a multicast address of a second peripheral bus multicast switch integrated in another one of the plurality of neural network accelerators, wherein the second peripheral bus multicast switch receiving the memory write multicast request packet is configured to forward a plurality of packets containing the data from the multicast request packet to other peripheral bus interface circuits, and wherein the second peripheral bus multicast switch receiving the memory write multicast request packet has an upstream port coupled towards to a root complex via the first peripheral bus multicast switch.

2. The system of claim 1, wherein the peripheral bus interface circuit in each neural network accelerator is a dual-mode peripheral bus interface circuit that is programmable to operate as a root complex or as an endpoint.

3. The system of claim 2, wherein the peripheral bus interface circuit in each neural network accelerator is programmed to operate as an endpoint, and wherein the system further includes a host root complex coupled to the set of peripheral bus links.

4. The system of claim 2, wherein the peripheral bus interface circuit in one of the neural network accelerators is programmed to operate as a root complex, and the peripheral bus interface circuit in the rest of the neural network accelerators is programmed to operate as an endpoint.

5. An integrated circuit device comprising:
first computation circuitry configured to perform neural network computations;
a first memory configured to store weights used by the first computation circuitry;
a peripheral bus interface circuit coupled to the first memory; and
a first peripheral bus multicast switch,
wherein the integrated circuit device is configured to distribute data associated with the weights to other integrated circuit devices by sending a memory write multicast request packet containing the data associated with the weights from the first peripheral bus multicast switch to a multicast address of a second peripheral bus multicast switch integrated in a second integrated circuit device having second computation circuitry and a second memory, and wherein the second peripheral bus multicast switch receiving the memory write multicast request packet has an upstream port coupled towards a root complex via the first peripheral bus multicast switch of the integrated circuit device.

6. The integrated circuit device of claim 5, wherein the data associated with the weights are gradient values that are used to update the weights during training.

7. The integrated circuit device of claim 5, wherein the data associated with the weights are weight values that are part of a neural network model.

8. The integrated circuit device of claim 5, wherein the second peripheral bus multicast switch includes a multicast address table that maps the multicast address to a set of multicast targets corresponding to the other integrated circuit devices.

9. The integrated circuit device of claim 8, wherein the second peripheral bus multicast switch is configured to forward a plurality of packets containing the data from the memory write multicast request packet to the set of multicast targets mapped to the multicast address.

10. The integrated circuit device of claim 9, wherein the second peripheral bus multicast switch is integrated with an endpoint, and the plurality of packets includes a packet targeted for that endpoint.

11. The integrated circuit device of claim 8, wherein the multicast address table stores different multicast addresses that are mapped to different sets of multicast targets.

12. The integrated circuit device of claim 11, wherein a first set of multicast targets associated with a first multicast address includes one or more multicast targets that belong to a second set of multicast targets associated with a second multicast address.

13. The integrated circuit device of claim 5, wherein the peripheral bus interface circuit is a dual-mode peripheral bus interface circuit that is programmable to operate as a root complex or an endpoint.

14. The integrated circuit device of claim 5, wherein the first peripheral bus multicast switch includes an upstream port of the first peripheral bus multicast switch that is coupled to a connection towards a root complex, and a plurality of downstream ports that are each coupled to a connection towards an endpoint.

15. The integrated circuit device of claim 14, wherein the upstream port of the first peripheral bus multicast switch is coupled to the peripheral bus interface circuit of the integrated circuit device operating as a root complex.

16. The integrated circuit device of claim 14, wherein the upstream port of the first peripheral bus multicast switch is coupled to a root complex that is external to the integrated circuit device.

17. A computer-implemented method comprising:
performing computations associated with a neural network model in a neural network accelerator having a first peripheral bus multicast switch integrated in the neural network accelerator to generate data associated with weights of the neural network model;
generating a multicast request packet containing the data associated with the weights, and an address in a multicast address range of a second peripheral bus multicast switch integrated in another integrated circuit device; and
sending the multicast request packet to a port of the second peripheral bus multicast switch,
wherein the second peripheral bus multicast switch generates a plurality of packets containing the data from the multicast request packet for forwarding to a plurality of peripheral bus ports, and wherein the second peripheral bus multicast switch receiving the multicast request packet has an upstream port coupled towards a root complex via the first peripheral bus multicast switch.

18. The computer-implemented method of claim 17, wherein the root complex is a peripheral bus interface circuit integrated in the neural network accelerator.

19. The computer-implemented method of claim 17, wherein the second peripheral bus multicast switch includes a plurality of downstream ports that are each coupled to a connection towards an endpoint.

20. The computer-implemented method of claim 17, wherein the neural network accelerator includes a dual-mode peripheral bus interface circuit that is programmable to operate as a root complex or an endpoint.

* * * * *